SHIFTING APPARATUS

Filed Sept. 26, 1957 2 Sheets-Sheet 1

INVENTORS.
Vernon L. Newhouse
& Albert S. Rettig
BY
Morris Liebman
ATTORNEY.

INVENTORS.
Vernon L. Newhouse
& Albert S. Rettig
BY Morris [signature]
ATTORNEY.

United States Patent Office 3,076,181

Patented Jan. 29, 1963

3,076,181

SHIFTING APPARATUS

Vernon L. Newhouse and Albert S. Rettig, Haddonfield, N.J., assignors to Radio Corporation of America, a corporation of Delaware Filed Sept. 26, 1957, Ser. No. 686,530
10 Claims. (Cl. 340—174)

This invention relates to information-handling systems, and particularly to apparatus for carrying out shifting operations in such systems.

Shifting operations often are used in information-handling systems in which the information is expressed in coded form. For example, certain arithmetic operations, such as multiplication and division, may involve the shifting of the digits of a character a number of places relative to a reference position. The number of places the digits are shifted may, in certain instances, exceed the number of digits in the character itself. In certain prior-art shifting apparatus, the shifting operation is made up of "$n$" separate shift operations where "$n$" is the desired number of places. Thus, the total shift operation time is "$n$" times that of a single shift operation. In general, it is desirable to carry out the shifting operation at relatively high speed.

It is an object of the present invention to provide improved shift apparatus whereby a character can be shifted any desired number of places in a single operation.

Another object of the present invention is to provide improved apparatus for performing shift operations, and particularly operations involving the shifting of an "$n$" digit character by "$n$" or more places.

Still another object of the present invention is to provide an improved shift apparatus which can be operated at relatively high speed and which requires relatively few components in its mechanization.

According to the present invention, a character is shifted from a first register to a second register interconnected with the first by means of a magnetic core array. A first set of coordinate lines of the array is activated by respective outputs of the first register. Means are provided for activating any desired one of a second set of coordinate lines of the array in accordance with the number of places desired to shift the first register character. A third set of coordinate lines of the array couples different groups of those array cores that are linked by the first set of coordinate lines to different inputs of the second register. The third set of coordinate lines may include a first group used in shifting in one direction, and a second group used in shifting in the other direction. Thus, a digit stored in the "$n$th" stage of the first register can be shifted to any desired stage of the second register.

A feature of the present invention resides in means for shifting a character a number of places exceeding the number of digits in the character in one operation, using relatively few additional components.

Figure 1:
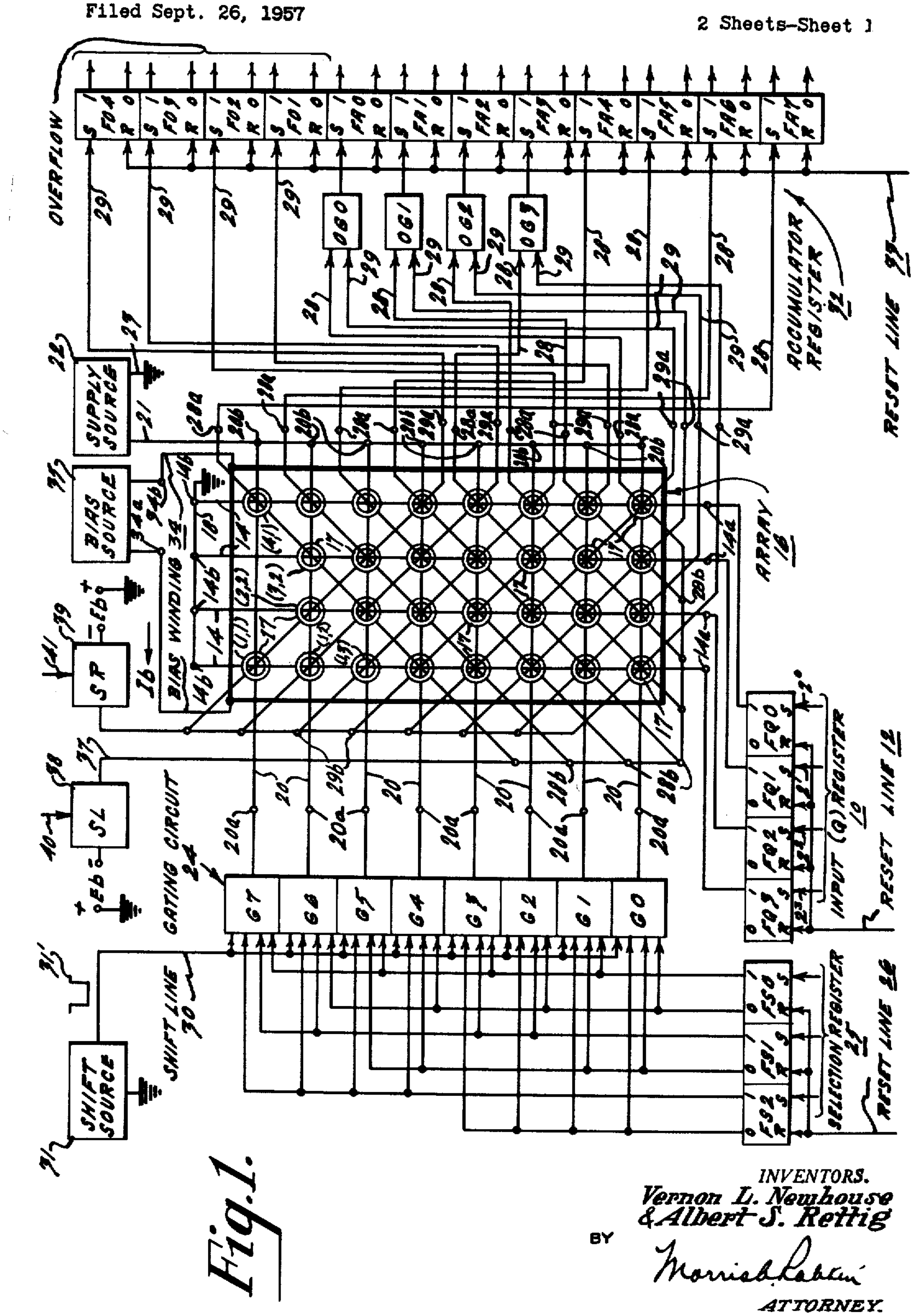
FIG. 1 is a schematic diagram of one embodiment of shift apparatus according to the invention.

Referring to FIG. 1, a first register 10, termed herein a Q register, is used to store the character to be shifted. The character, for example, may be a four-digit numerical character expressed in any suitable coded form, such as a binary positional notation.

The Q register 10 includes a plurality of flip-flop circuits, one for each digit of the character. The four digits of order $2^0$, $2^1$, $2^2$ and $2^3$ are each stored in a corresponding one of the Q register flip-flops FQ0, FG1, FQ2 and FQ3. Each flip-flop FQ0–FQ3 is provided with a set (S) input and a reset (R) input, and corresponding "1" and "0" outputs. When any of these flip-flops is in its set condition, its "1" output is high relative to its "0" output and, when any flip-flop is in its reset condition, its "0" output is high relative to its "1" output. The set and reset conditions of a flip-flop may correspond to the storing of the respective states "1" and "0" of a binary digit. Signals representing the four digits of order $2^0$–$2^3$ of the character are applied respectively to the set (S) inputs of the Q register flip-flops FQ0–FQ3. A common reset signal may be applied to the reset inputs (R) of all the Q register 10 flip-flops over a common reset line 12. The "1" outputs of the Q register 10 are connected respectively to four column lines 14 of a magnetic core array 16. The column lines 14 serve as the first set of coordinate lines of the array 16. The array 16 has, for example, four columns and eight rows of cores 17. The first and last columns each has eight cores 17 and the second and third columns each has seven cores 17, for reasons more fully apparent hereinafter. Each of the four column lines 14 is respectively connected at its terminal **14*a* to the "1" output of a separate one of the four flip-flops FF0–FF3 of the Q register 10. The column lines 14, after linking the different array cores 17 of a column, are connected at their terminals 14*b* to a first shorting bus 18. The shorting bus 18** is connected to a source of reference potential indicated in the drawing by the conventional ground symbol.

The eight row lines 20 of the array 16 serve as the second set of coordinate lines. Each column of cores 17 of the array 16 is linked by a different one of the column lines 14, and each row of cores 12 is linked by a different one of the row lines 20. Each of the row lines 20 has one extreme end terminal **20*a* connected to a different one of eight outputs of a gating circuit 24, and has another extreme end terminal 20*b* connected to an output 21 of a supply source 22. The supply source 22 has a ground connection 23**.

The gating circuit 24 includes eight separate "and" gate circuits G0–G7. Each of the "and" gates G0–G7 has four inputs and a single output. A first three of the inputs of all the "and" gates G0–G7 of the gating circuit 24 are connected in combinatorial fashion to the "1" and "0" outputs of a three-flip-flop selection register 25. The fourth inputs of all the "and" gates G0–G7 are connected to a common shift line 30. The shift line 30 is connected to one output of a shift source 31 which has another output connected to ground.

The selection register 25 has three flip-flop circuits FS0, FS1 and FS2. Three flip-flops are sufficient for selecting any desired one of the eight "and" gates G0–G7 of the gating circuit 24. The "0" output of the FS2 selection flip-flop is connected to the first four "and" gates G0–G3 and the "1" output of the FS2 selection flip-flop is connected to the other four "and" gates G4–G7. The "1" and "0" outputs of the FS1 and FS0 selection flip-flops are each connected to other, different groups each consisting of four of the "and" gates G0–G7. The flip-flops of the selection register 25 are reset by reset signals applied to a common reset line 26.

The third set of sixteen coordinate lines of the array 16 includes a first group of eight diagonal lines 28 slanting upwardly from left to right, and a second group of eight diagonal lines 29 slanting upwardly from right to left. Each of the third set of array lines 28, 29 couples a different group of array cores 17 to an accumulator register 32. The accumulator register 32 receives the shifted character from the Q register 10. The accumulator register 32, for example, has twelve flip-flop stages FA0–FA7 inclusive, and F01–F04 inclusive, to provide storage of a Q register 10 character shifted by eight places in either the left or the right direction. The eight stages FA0–FA7 of the accumulator register 32 are used during a left shift operation, and the stages F01–F04 of the accumulator register 32 are used, for example, to provide for storage of any "overflow" produced during a right shift operation.

The third set of sixteen array coordinate lines serve as array sensing windings. The first group of eight sensing windings 28 are used in a shift left operation, and the second group of eight sensing windings 29 are used in a shift right operation. The uppermost sensing winding 28 of the shift left sensing windings 28 links the cores 17 of the array coordinate positions (1, 4), (2, 3), (3,2) and (4, 1) and has its terminal 28*a* connected to the set input (S) of the flip-flop FA7 of the accumulator register 32. Succeeding ones of the shift left sensing windings 28 link succeeding ones of the cores 17 in the four array columns and are connected at their terminals 28*a* to the set inputs (S) of the accumulator flip-flops FA6–FA0, respectively. All the shift left sensing windings 28 have their terminals 28*b* connected to a common output lead 37 of a shift left (SL) gate 38. The shift left gate 38 has one terminal connected to the negative terminal of a common bias source E*b* having its positive terminal connected to ground. The shift left gate 37 has an input terminal connected to a shift left lead 40.

The uppermost sensing winding 29 of the shift right sensing windings 29 links the cores 17 of the array coordinate positions (1, 1), (2, 2), (3, 3) and (4, 4) and has its terminal 29*a* connected to the set input (S) of the F04 flip-flop of the accumulator register 32. Succeeding ones of the shift right sensing windings 29 link succeeding lower ones of the cores 17 of the array columns and have their terminals 29*a* connected to the set inputs (S) of the accumulator flip-flops F03–F01 and FA0–FA3 respectively. The four lowest ones of the shift left windings 28 and the shift right windings 29 are connected respectively to first and second inputs of four two-input "or" gates 40. The four outputs of the "or" gates 40 are connected respectively to the set inputs (S) of the flip-flops FA0–FA3 of the accumulator register 32. All the shift right sensing windings 29 are connected at their terminals 29*b* to a common output of a shift right (SR) gate 39. The shift right gate has one terminal connected to the negative terminal of the common bias source E*b* and has an input terminal connected to a shift right lead 41.

Each of the accumulator flip-flops FA0–FA7 has its reset input (R) connected to a common reset line 33. The twelve "1" and "0" outputs of the accumulator register 32 provide signals representing the shifted character.

A bias winding 34 links all the cores 17 of the array. For convenience of drawing, the separate linkages of the bias winding 34 to the individual array cores 17 are not shown. The bias winding 34, after linking all the array cores 17, is connected to a source 35 of bias potential.

Figure 2:
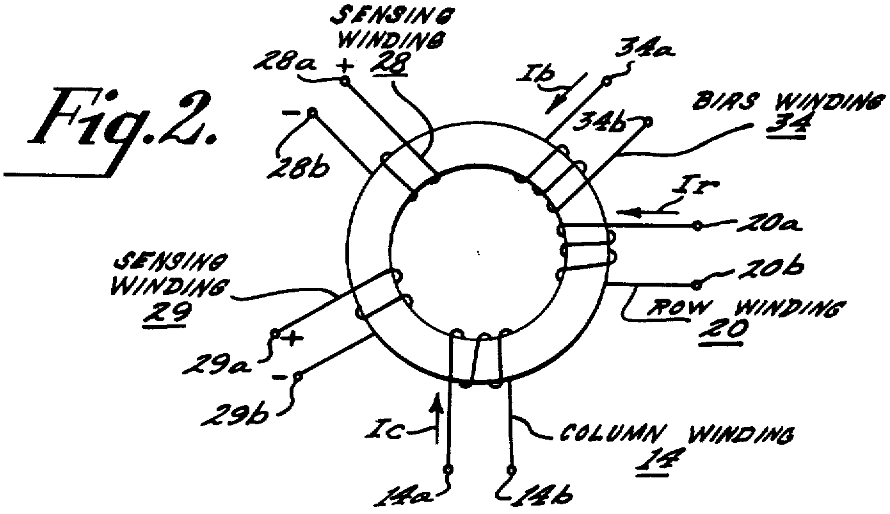
FIG. 2 is a schematic drawing showing the winding arrangement of one of the array cores of FIG. 1 and useful in explaining the operation of the shift apparatus of FIG. 1.
Figure 3:
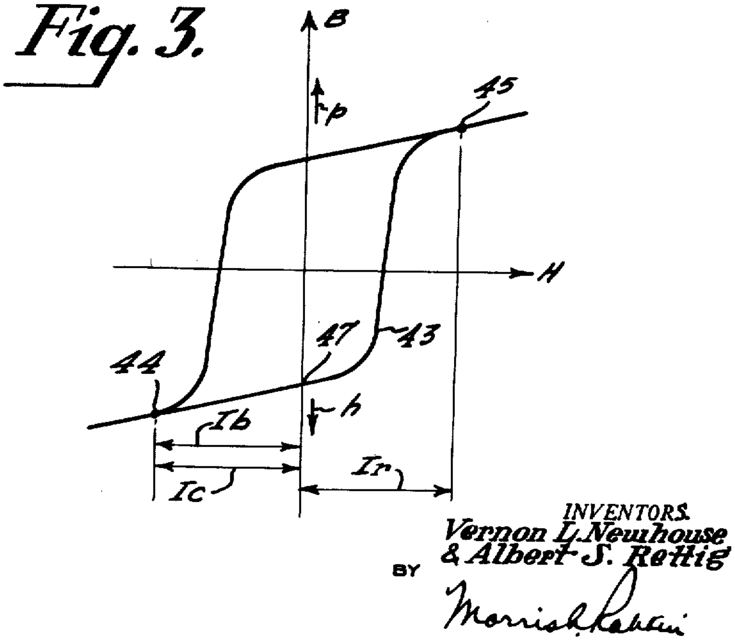
FIG. 3 is a graph of a hysteresis characteristic of one of the array cores of FIG. 1.

One of the array cores 17 is shown in FIG. 2, separate from the array 16. The core 17 need not have a rectangular hysteresis loop characteristic but preferably has two distinct states of saturation, and has relatively little slope in the two saturated regions. The curve 43 of FIG. 3 represents a suitable B—H hysteresis characteristic for an array core 17. The core 17 is a saturable core having two saturated states, namely, a positive (P) and a negative (N) state of saturation. The two states of saturation of the core 17 are represented in FIG. 3 by the points 44 and 45, respectively, on the curve 43.

A bias current applied to the bias winding 34, in the direction (conventional) indicated by the arrow I*b* of FIG. 2, applies a negative magnetizing force to the core 17 to bias the core 17 to saturation in one state, for example the state N, as represented by the point 44 of the curve 43. A column current flowing in the column coil 14, in the direction indicated by the arrow I*c* of FIG. 2, applies a positive magnetizing force to the core 17 to oppose the negative bias magnetizing force. The magnetizing force generated by the column current is sufficient in amplitude to cancel the bias magnetizing force but insufficient to change the core 17 from the state N. As indicated in FIG. 3, the point representing the state of a core 17, receiving the additional column current, moves along the bottom portion of the curve 43 from the point 44 to a point 47. A row current flowing in a row coil 20, in the direction indicated by the arrow I*r* of FIG. 2, applies another positive magnetizing force to the core 17. Equal amplitude, positive magnetizing forces may be applied to a core 17 by the column and row currents. Preferably, the shift source 21 is any suitable constant-current source. A core 17 receiving either one, but not both, of the column and row currents remains magnetized in the initial state N, as represented by the point 47 of the curve 43. Relatively little flux change is produced in a core 17 when its state is changed along the bottom portion of the curve 43 between the points 44 and 47. Accordingly, relatively little voltage is induced in the sensing windings 28 and 29 of a core 17 thus changed. However, a core 17 that receives both a column current and a row current changes from the N state, as represented by a point moving along the right branch of the curve 43, to or near saturation in the P state, as represented by the point 45. The relatively large flux change produced in a core 17, when it is changed from the N to the P state, produces a relatively large output voltage across the sensing windings 28 and 29 linked to the core 17 thus changed. This relatively large output voltage is in a direction to make the terminals 28*a* and 29*a* of the sensing windings 28 and 29 positive relative to the terminals 28*b* and 29*b*.

When the column and row currents are removed from the row windings 14 and 20, the bias current returns the core 17 to saturation in the state N. The point representing the state of the core 17 moves along the left branch of the curve 43 from the point 44. A relatively large flux change is produced when the core 17 is changed from the P to the N state. This large flux change induces a negative-polarity voltage across the sensing windings 28 and 29 in a direction to make the terminals 28*a* and 29*a* negative relative to the terminals 28*b* and 29*b*. The negative-polarity voltage is blocked from the accumulator register 32 of FIG. 1 by connecting separate, suitably poled, unilateral conducting devices in each sensing winding 28. These unilateral conducting devices also may serve as a means for preventing undesired circulation of currents between the sensing windings 28 and 29 during a shift left or a shift right operation. A core 17 receiving only one of the column and row currents is returned to its initial saturated state by the bias current when the one row or column current is terminated. Relatively little flux change is produced in a core 17 when its state changes from that represented by the point 47 to that represented by the point 44.

Referring once again to FIG. 1, initially each of the registers 10, 25 and 32 is placed in a reset condition by applying suitable reset pulses to the common reset lines 12, 26 and 33. The reset and other signals used in operating the shifting apparatus may be derived from any suitable source, such as the control unit of a digital computer.

The input character to be shifted is set into the Q register 10 by applying appropriate signals to the set leads designated $2^0$–$2^3$ respectively connected to the set inputs (S) of the Q register 10. The least significant digit of the input character is set into the FQ0 flip-flop, and the most significant digit of the input character is set into the FQ3 flip-flop of the register 10. Each of the array cores 17 of the array 16 is biased to saturation in one of its two states by a steady bias current $I_b$ applied to the bias winding 34 by the bias source 35. Each of the flip-flops FQ0–FQ3 of the Q register 10 that is in the set condition provides a relatively high-level output signal at its "1" output. These high-level "1" output signals each produces a current flow in a corresponding one of the column lines 14 in a direction to oppose the bias current. Each of the Q register 10 flip-flops that is reset provides a relatively low-level "1" output signal and substantially no current flows in its connected column line 14. Accordingly, the columns of cores 17, corresponding to those of the Q register 10 flip-flops which are reset, remain biased to saturation in the initial state.

Assume, now, that it is desired to shift the input character set into the Q register 10 to the left relative to the zero order position by five places. A signal is applied to the shift left lead 40 of the shift left gate 38. This signal operates to connect the terminals 28*b* of the shift left sensing windings to ground via a low-impedance path. The terminals 29*b* of the shift right sensing windings 29 are open-circuited from ground, at this time, due to the absence of a shift right signal on the shift right lead 41. Signals representing the number of places it is desired to shift the input character are applied in parallel to the set inputs (S) of the selection register 24. Thus, in the assumed case, the flip-flops FS0 and FS2 of the selection register 24 are in the set condition, and the third flip-flop FS1 is in its reset condition. The relatively high-level "1" outputs of the FS0 and FS2 flip-flops, and the relatively high-level "0" output of the FS1 flip-flop, enable the "and" gate G5 of the gating circuit 24 at each of its first three inputs. Each of the other "and" gates G0–G4 and G6–G7 of the gating circuit 24 is not enabled at one or more of its first three inputs. At any desired later time, the shift source 31 is activated to apply a shift pulse, indicated by the negative pulse 31' to the shift line 30. The shaft pulse 31' activates the enabled "and" gate G5 and a resultant row current flows from the supply source 21 through the sixth (from the bottom) row line 20 and through the activated "and" gate G5 to ground. This row current is of sufficient intensity to drive any of the cores 17 of the fifth row, which are not biased to saturation in the initial state, towards saturation in their other states. The resultant flux changes in these driver cores 17 of the fifth row induce relatively large output signals in the connected shift left sensing windings 28. These large output signals in the sensing windings 28 are applied to the set inputs (S) of corresponding ones of the flip-flops FA4–FA7 of the accumulator register 32. Thus, the signal stored in the Q register 10 flip-flop FQ0 is shifted to the accumulator register flip-flop FA5, and so on, with the signal stored in the Q register flip-flop FQ2 being shifted to the accumulator flip-flop FA7. Note that, in the exemplary embodiment, the signal stored in the FQ3 flip-flop is discarded in a shift right operation of five or more places. However, additional sensing windings 28 and additional accumulator register stages can be provided, if desired. A "1" digit stored in Q register flip-flop of order "*n*" operates to set the accumulator register flip-flop of order $n+5$, thereby operating to shift each binary "1" digit by five places. The remaining Q register flip-flops already are in their reset condition, thereby representing a binary "0" digit.

The operation is similar for any other desired number of places from 0 to 8, except that the shift pulse 31' is applied to a different row winding 20.

The signals induced in the shift right sensing windings 29 by the changed cores 17 do not produce any resultant current flow therein because these sensing windings are open-circuited at the right gate 39.

A new input character stored in the Q register 10 may be shifted to the left by any number of places, in similar manner, by resetting the accumulator register 32 and the selection register 24, and by applying signals representing the desired number of places to the selection register 24.

The above-described operation represents a left shift operation which may be used, for example, in a multiplication process. A right shift operation is obtained in similar manner except that a shift right signal is applied to the shift right input 41 of the shift right gate 39. In such case, the shift left sensing windings 28 are all open-circuited from ground. The register character then can be shifted any desired number of places, to the right, in the same manner as above described. For example, in a right shift operation of zero places, the binary digit stored in the FQ3 flip-flop of the Q register 10 is transferred via the "or" gate OG3 to the FA3 flip-flop; the digit of the FQ2 flip-flop is transferred via the "or" gate OG2 to the FA2 flip-flop, and so on. Successively higher-order shift right operations then transfer the digit of the Q register 10 FQ3 flip-flop to successive lower-order flip-flops FA2–FA0, and F01–F04 of the accumulator register 32, and so on, for the other digits of the Q register flip-flops.

There has been described herein improved shift apparatus for performing shift operations in either direction. In the exemplary apparatus of FIG. 1, the overflow portion of the accumulator register 32, may be replaced in known manner by circulating the output of the FA0 flip-flop to the input of the FA7 flip-flop. The shift apparatus of the present invention is particularly useful in parallel-type information handling machines in which the characters are handled in parallel fashion.

The shift apparatus of the present invention also is useful in display-type apparatus wherein an alphabetic, or a numerical character, or a special symbol is displayed on a suitable display panel. For example, a plurality of characters may be handled at the same time by employing a separate core array of FIG. 1 for each separate character. In such case, a common bias, supply, and shift source may be used for all the arrays.

What is claimed is:

1. In a magnetic shifting apparatus for shifting an "*m*" binary digit number by a desired number of places between "0" and "*n*," the combination of a plurality of magnetic elements each having two states of saturation, said elements being arrayed in "*n*" rows and "*m*" columns, a plurality of "*n*" row coils each corresponding to a different one of said places, each said row of elements being linked by a different row coil, a plurality of "*m*" column coils each corresponding to a separate digit of said number, each said column of elements being linked by a different column coil, a plurality of "*n*" diagonal sensing windings, said sensing windings, beginning at one corner of said array, each linking a different group of said elements with the last said group including only a single element, a bias winding linking all said elements, means for applying a bias current to said bias winding, means for applying signals to activate those ones of said column coils which correspond to binary "1" digits in said number and not applying signals to those ones of the column coils corresponding to binary "0" digits in said number, and means for activating the one of said row coils corresponding to the number of places by which the number is to be shifted concurrently with said column signals, said elements linked by said activated column coils and said one row coil inducing signals in the sensing windings respectively coupled thereto.

2. In a magnetic shifting apparatus for shifting an "*m*" binary digit number by a desired number of places between "0" and ±"*n*," the combination of a plurality of magnetic elements each having two states of saturation, said elements being arrayed in "*n*" rows and "*m*" columns, a plurality of "*n*" row coils each corresponding to a different one of said places and each linking a different row of said elements, a plurality of "*m*" column coils each corresponding to a different one of said digits and each linking a different column of said elements, a first plurality of "*n*" diagonal sensing windings for shifting said number in the higher order direction, said first plurality of sensing windings, beginning at one corner of said array each linking a different group of said elements with the last said group including only a single element, a second plurality of "n" diagonal sensing windings for shifting said number in the lower order direction, said second plurality of sensing windings, beginning at the array corner adjacent said one corner, each linking a different group of said elements with the last said group including only a single element, a bias winding linking all said elements, means for applying a bias current to said bias winding, means for enabling either said first or said second plurality of sensing windings in accordance with the shift direction, means for applying signals to activate those ones of said column coils which correspond to binary "1" digits in said number and not applying signals to those ones of the column coils corresponding to binary "0" digits in said number, and means for activating the one of said row coils corresponding to the number of places by which a number is to be shifted concurrently with said column signals.

3. In a magnetic shifting apparatus for shifting an "m" digit binary number by a desired number of places between "0" and "n," the combination of a plurality of magnetic elements each having two states of saturation, said elements being arrayed in "n" rows and "m" columns, certain of said columns having a larger number of elements than others of said columns, a plurality of "n" row coils each corresponding to a different one of said places, each said row of elements being linked by a different row coil, a plurality of "m" column coils each corresponding to a different one of said places, each said column of elements being linked by a different column coil, a plurality of "n" diagonal sensing windings, said sensing windings, beginning at one corner of said array, each linking a different group of said elements with the last said group including only a single element, a bias winding linking all said elements, means for applying a bias current to said bias winding, means for applying signals to activate those ones of said column coils which correspond to binary "1" digits in said number and not applying signals to those ones of the column coils corresponding to said binary "0" digits in said number, and means for activating the one of said row coils corresponding to the number of places by which a number is to be shifted concurrently with said column signals, said elements linked by said activated column coils and said one row coil inducing signals in the sensing winding respectively coupled thereto.

4. In a magnetic shifting apparatus for shifting an "m" digit binary number by a desired number of places between "0" and "n," the combination of a plurality of magnetic elements each having two states of saturation, said elements being arrayed in "n" rows and "m" columns, successive ones of said columns having a successively smaller number of elements, a plurality of "n" row coils each corresponding to a different one of said places, each said row of elements being linked by a different row coil, a plurality of "m" column coils each corresponding to a different one of said digits, each said column of elements being linked by a different column coil, a plurality of diagonal sensing windings, a first of said sensing windings linking the topmost elements in each of said columns, a second of said sensing windings linking the elements immediately below the topmost elements in each column, etc. with the last sensing winding linking only a single element, a bias winding linking all said elements, means for applying a bias current to said bias winding, means for applying signals to activate those ones of said column coils which correspond to binary "1" digits in said number and not applying signals to those ones of the column coils corresponding to said binary "0" digits in said number, and means for activating the one of said row coils corresponding to the number of places by which a number is to be shifted concurrently with said column signals, said elements linked by said activated column coils and said one row coil inducing signals in the sensing winding respectively coupled thereto.

5. In a shifting apparatus for shifting an "m" digit binary number by a desired number of places between "0" and "n," the combination of a plurality of magnetic elements arranged in "n" rows and "m" columns, said elements each having two states of saturation, a plurality of "n" row lines each corresponding to a different one of said places each linking a different said row of elements, a plurality of "m" column lines each corresponding to a different digit in said number each linking a different said column of elemnts, first and second pluralities of "n" sensing windings, each said sensing winding linking a different group of said elements, certain ones of said elements being linked by one of said first and one of said second sensing windings and others of said elements being linked by one of said first and not by any of said second sensing windings, separate means for selectively enabling all the sensing windings of either one or the other of said pluralities, means for biasing all said elements to one of said two states of saturation, and means for activating those ones of said column lines which correspond to binary "1" digits in said number and not applying signals to those ones of the column coils corresponding to said binary "0" digits in said number concurrently with the one of said row lines corresponding to the number of places by which the number is to be shifted, said elements linked by both an activated column and an activated row line changing from said one to the other of said two states, said changed elements inducing output signals in the sensing windings of said enabled plurality.

6. In a shifting apparatus for shifting an "m" digit character stored in a first register by a desired number of places between "0" and "n," the combination of a magnetic element array having a plurality of elements and having three sets of coordinate lines, said array elements each having two states of saturation, a first of said sets having "n" coordinate lines each being linked to a different first group of said elements and being connected to said first register, separate ones of a second of said sets having "n" coordinate lines for controlling the number of places by which said charcter is shifted, each said second coordinate line being linked to a different second group of said elements, a second register for storing the shifted character, the third of said sets having "n" coordinate lines coupling different third groups of said array elements to said second register, each element of said third group being common to a different said first and a different said second group, means for biasing each of said array elements to one of said two states of saturation, and means for applying separate signals to activate those ones of said first set of coordinate lines which correspond to binary "1" digits in said character and not applying signals on the remaining ones of said first coordinate lines and to activate the one of said second coordinate lines corresponding to the number of places by which said character is to be shifted, said signals being applied concurrently in a direction to change said elements common to said activated lines of said first set and said one activated of said second set from said one state to the other of said states, each of said common elements inducing a signal in its said third coordinate line.

7. In a shifting apparatus for shifting an "m" digit character by "n" places, the combination of a plurality of magnetic elements arranged in "n" rows and "m" columns, a plurality of "n" row coils each corresponding to a different one of said places and each linking a different said row, a plurality of "m" column coils each corresponding to a different one of said digits and each linking a different said column, a first plurality of "n" sensing windings linking said elements in a diagonal direction, one said first sensing winding linking the diagonal group of elements between the first row and first column and the $m$th column and $m$th row, and another said first sensing winding linking the diagonal group of elements between the first column and second row and the $m$th column and $(m+1)$st row, etc., and a second plurality of "$n$" sensing windings linking said elements in the other diagonal direction, one said second sensing winding linking the diagonal group of elements between the $m$th column and first row and the first column and $m$th row, another said second sensing winding linking the diagonal group of elements between the $m$th column and second row and the first column and $(m+1)$ row, etc., a bias winding linking all said elements, means for applying a bias current to said bias winding, means for enabling either said first or said second plurality of sensing windings, means for activating those ones of the "$m$" column lines which correspond to binary "1" digits in said character, and means for activating the one of said row coils corresponding to a number of places by which said character is to be shifted.

8. In a shifting apparatus, the combination as claimed in claim 7, including an input register having "$m$" stages for storing said character, individual stages of said input register being coupled to individual ones of said "$m$" column coils, an accumulator register having a plurality of stages, "$m$" first sensing windings and "$m$" second sensing windings being coupled in pairs to "$m$" stages of said accumulator register, each said pair including one first and one second sensing windings, and each said pair being coupled to a different one of said "$m$" accumulator stages, successive ones of the others of said first sensing windings being coupled to successive said accumulator register stages in one direction from said "$m$" stages, and successive ones of the others of said second sensing windings being coupled to successive ones of said accumulator register stages in the opposite direction from said "$m$" stages.

9. In a magnetic shifting apparatus for shifting a binary number by a desired number of places between "0" and "$n$," the combination of a plurality of magnetic elements each having two states of saturation, said elements being arrayed in "$n$" rows and "$m$" columns, a plurality of "$n$" row coils each corresponding to a different one of said places, each said row of elements being linked by a different row coil, a plurality of "$m$" column coils each corresponding to a different digit of said number, each said column of elements being linked by a different column coil, a bias coil linked to all said elements for biasing said elements to one of said two saturated states, a plurality of "$n$" diagonal sensing windings, said sensing windings, beginning at one corner of said array, each linking a different group of said elements with the last said group including only a single element, an "$m$" digit storage register connected to said column coils for enabling said column coils in accordance with information stored in said register, an "$n$" digit accumulator connected to said sensing windings for receiving information from said register, and a gating network connected to said row coils for activating the one of said row coils in accordance with the number of places desired to shift said register information, each said element linked by an enabled column coil and an activated row coil being changed from said one toward the other of said saturated states by an appreciable amount, said changed elements inducing an appreciable output signal in the linked sensing windings.

10. In a shifting apparatus for shifting an "$m$" digit number by a desired number of places between "0" and "$n$," the combination of a plurality of magnetic elements arranged in rows and columns, said elements each having two states of saturation, a plurality of "$n$" row lines each corresponding to a different one of said places each linking a different said row of elements, a plurality of "$m$" column lines each corresponding to a different digit of said number each linking a different said column of elements, an "$m$" digit input register for storing an input character, said column coils being individually coupled to individual stages of said input register, first and second pluralities of "$n$" sensing windings, each said sensing winding linking a different group of said elements, certain ones of said elements being linked by one of said first and one of said second sensing windings and others of said elements being linked by one of said first and not by any of said second sensing windings, separate means for selectively enabling all the sensing windings of either one or the other of said pluralities, an "$n+m$" digit accumulator register for storing said input character shifted by said desired number of places, said first plurality of sensing windings being individually coupled to individual stages of said accumulator register beginning at one end thereof, said second plurality of sensing windings being individually coupled to individual stages of said accumulator register beginning at the other end thereof, means for biasing all said elements to one of said two states of saturation, and means for activating those ones of said column lines corresponding to binary "1" digits of said number and not activating the remaining ones of said column lines concurrently with the one of said row lines corresponding to the desired number of places, said elements linked by both an activated column and an activated row line changing from said one to the other of said two states, said changed elements inducing output signals in the sensing windings of said enabled plurality.

References Cited in the file of this patent

UNITED STATES PATENTS

| | | |
|---|---|---|
| 2,691,156 | Saltz et al. | Oct. 5, 1954 |
| 2,722,375 | Chenus | Nov. 1, 1955 |
| 2,734,184 | Rajchman | Feb. 6, 1956 |
| 2,843,838 | Abbott | July 15, 1958 |
| 2,932,451 | Beattie et al. | Apr. 12, 1960 |